United States Patent
Pogén

(10) Patent No.: US 12,544,772 B2
(45) Date of Patent: Feb. 10, 2026

(54) CENTRIFUGAL SEPARATOR FOR CLEANING GAS

(71) Applicant: Alfdex AB, Landskrona (SE)

(72) Inventor: Mats-Örjan Pogén, Billeberga (SE)

(73) Assignee: ALFDEX AB, Landskrona (SE)

( * ) Notice: Subject to any disclaimer, the term of this patent is extended or adjusted under 35 U.S.C. 154(b) by 301 days.

(21) Appl. No.: 18/036,712

(22) PCT Filed: Nov. 2, 2021

(86) PCT No.: PCT/EP2021/080334
§ 371 (c)(1),
(2) Date: May 12, 2023

(87) PCT Pub. No.: WO2022/111948
PCT Pub. Date: Jun. 2, 2022

(65) Prior Publication Data
US 2023/0415171 A1    Dec. 28, 2023

(30) Foreign Application Priority Data
Nov. 30, 2020  (EP) ..................... 20210560

(51) Int. Cl.
*B04B 11/02*  (2006.01)
*B04B 5/12*   (2006.01)
*F01M 13/04*  (2006.01)

(52) U.S. Cl.
CPC .............. *B04B 11/02* (2013.01); *B04B 5/12* (2013.01); *B04B 2005/125* (2013.01); *F01M 2013/0422* (2013.01)

(58) Field of Classification Search
CPC .. B04B 11/02; B04B 5/12; B04B 7/02; B01D 46/0056
See application file for complete search history.

(56) References Cited

U.S. PATENT DOCUMENTS 5,464,536 A    11/1995 Rogers
6,536,211 B1   3/2003 Borgstrom et al.
(Continued)

FOREIGN PATENT DOCUMENTS

CN    109107778 A    1/2019
WO    WO 93/25294 A1  12/1993
(Continued)

OTHER PUBLICATIONS

International Search Report, issued in PCT/EP2021/080334, dated Feb. 10, 2022.
(Continued)

*Primary Examiner* — Sharon Pregler
(74) *Attorney, Agent, or Firm* — Birch, Stewart, Kolasch & Birch, LLP

(57) ABSTRACT

A centrifugal separator for cleaning gas containing contaminants includes a stationary casing, a gas inlet, a rotating member, a gas outlet including an outlet opening through a wall of the stationary casing, a drainage outlet arranged in the lower portion of the stationary casing, a drive member for rotating the rotating member, and a stationary axial surface extending into the separation space. The rotating member includes a rotatable axial surface arranged radially outside the stationary axial surface. The rotatable axial surface is arranged at the gas inlet such that liquid contaminants present in the gas to be cleaned is pressed against the rotatable axial surface during operation. The rotating member includes a brim portion extending radially inwards from the rotatable axial surface and forms a ring-shaped sealing gap between the rotating member and the stationary axial surface.

20 Claims, 2 Drawing Sheets

(56) References Cited

U.S. PATENT DOCUMENTS

| | | |
|---|---|---|
| 8,657,908 B2 | 2/2014 | Eliasson |
| 9,545,591 B2 * | 1/2017 | Parikh ................ B01D 46/2403 |
| 2016/0030875 A1 | 2/2016 | Parikh et al. |

FOREIGN PATENT DOCUMENTS

| | | |
|---|---|---|
| WO | WO 99/56882 A1 | 11/1999 |
| WO | WO 2013/067245 A1 | 5/2013 |
| WO | WO 2018/188908 A1 | 10/2018 |

OTHER PUBLICATIONS

Written Opinion of the International Searching Authority, issued in PCT/EP2021/080334, dated Feb. 10, 2022.

\* cited by examiner

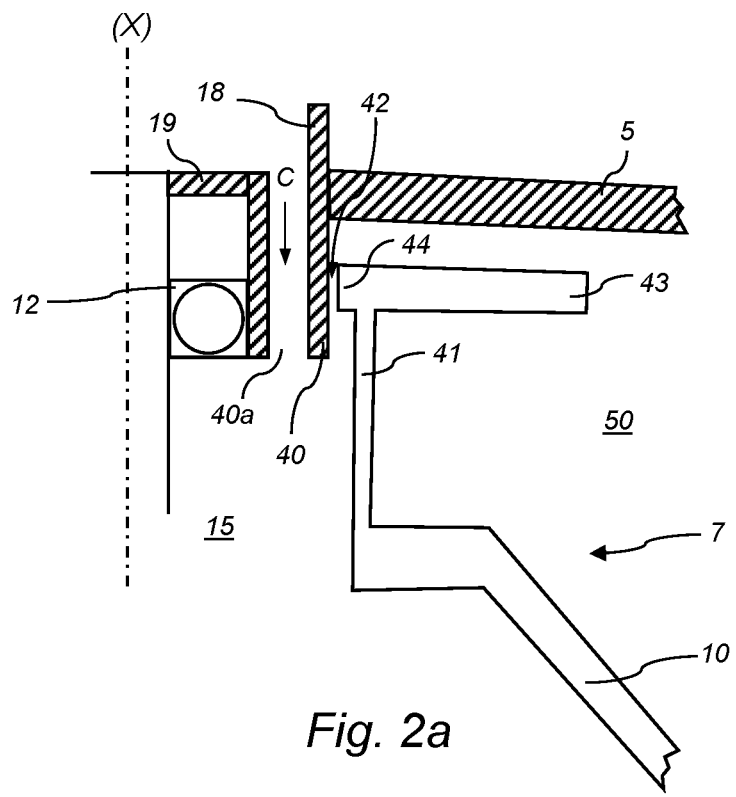
Fig. 2a
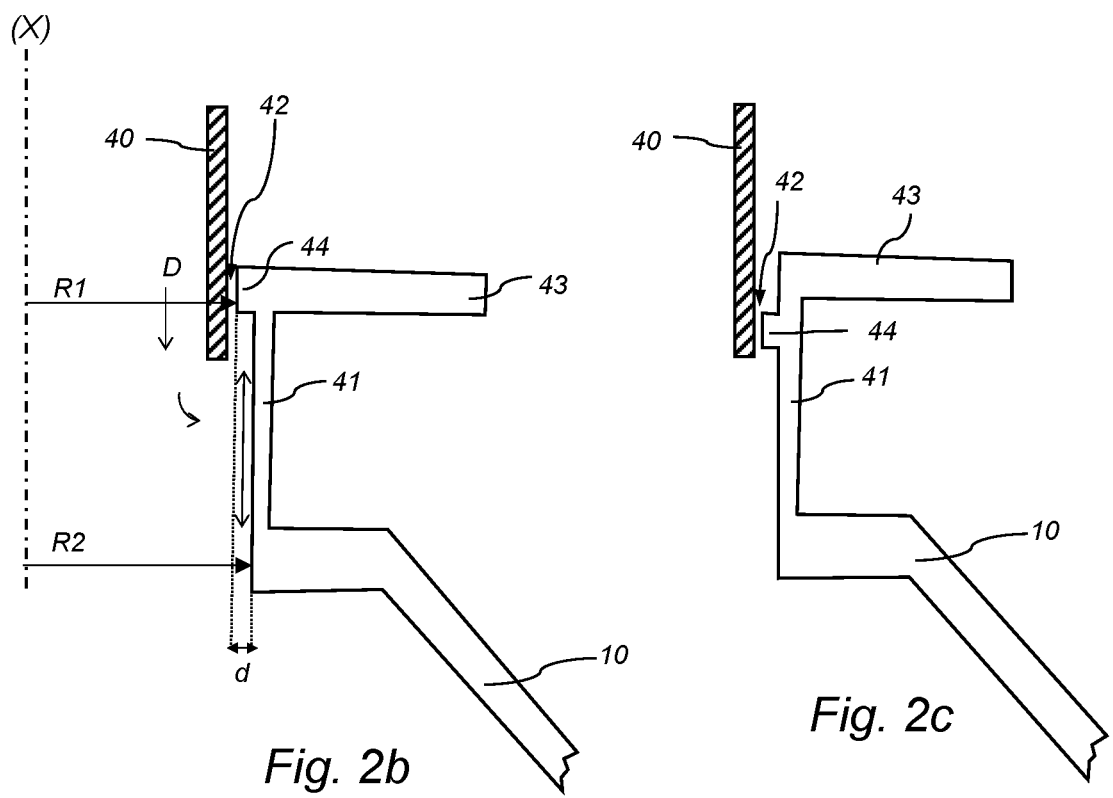
Fig. 2b
Fig. 2c

CENTRIFUGAL SEPARATOR FOR CLEANING GAS

FIELD OF THE INVENTION

The present invention relates to the field of centrifugal separators for cleaning a gas containing liquid contaminants. In particular, the present invention relates to cleaning crankcase gases of a combustion engine from oil particles.

BACKGROUND OF THE INVENTION

It is well known that a mixture of fluids having different densities may be separated from one another through use of a centrifugal separator. One specific use of such a separator is in the separation of oil from gas vented from a crankcase forming part of an internal combustion engine.

Regarding this specific use of separators, there can be a tendency for the high-pressure gas found in the combustion chambers of an internal combustion engine to leak past the associated piston rings and into the crankcase of the engine. This continuous leaking of gas into the crankcase can lead to an undesirable increase of pressure within the crankcase and, as a consequence, to a need to vent gas from the casing. Such gas vented from the crankcase typically carries a quantity of engine oil (as droplets or a fine mist), which is picked up from the reservoir of oil held in the crankcase.

In order to allow vented gas to be introduced into the inlet system without also introducing unwanted oil (particularly into a turbocharging system wherein the efficiency of the compressor can be adversely affected by the presence of oil), it is necessary to clean the vented gas (i.e. to remove the oil carried by the gas) prior to the gas being introduced into the inlet system. This cleaning process may be undertaken by a centrifugal separator, which is mounted on or adjacent the crankcase and which directs cleaned gas to the inlet system and directs separated oil back to the crankcase. An example of such a separator is disclosed e.g. in U.S. Pat. No. 8,657,908. Such separators usually comprise a number of separation discs, e.g. arranged in a stack or as axially extending surface plates, and the separation of oil from the gas takes place between such discs, in which oil being collected on the disc is thrown radially outwards to a surrounding wall.

However, there is a risk of oil present in the gas to be cleaned to escape through the separator without having passed the means for separation, such as through the stack of separation discs.

There is thus a need in the art for improved solutions for decreasing the risk of oil carry-over into the cleaned gas.

SUMMARY OF THE INVENTION

It is an object of the invention to at least partly overcome one or more limitations of the prior art. In particular, it is an object to provide a centrifugal separator with decreased risk of oil carry-over into cleaned gas.

As a first aspect of the invention, there is provided a centrifugal separator for cleaning gas containing contaminants comprising

- a stationary casing, enclosing a separation space through which a gas flow is permitted,
- a gas inlet extending through the stationary casing and permitting supply of the gas to be cleaned,
- a rotating member comprising a plurality of separation members arranged in the separation space and being arranged to rotate around an axis (X) of rotation,
- a gas outlet configured to permit discharge of cleaned gas and comprising an outlet opening through a wall of the stationary casing,
- a drainage outlet arranged in the lower portion of the stationary casing and configured to permit discharge of liquid contaminants separated from the gas to be cleaned;
- a drive member for rotating the rotating member;
- and wherein the centrifugal separator further comprises a stationary axial surface extending into the separation space and the rotating member comprises a rotatable axial surface arranged radially outside the stationary axial surface;
- and wherein the rotatable axial surface is arranged at the gas inlet such that liquid contaminants present in the gas to be cleaned is pressed against the rotatable axial surface during operation, and further wherein
- the rotating member comprises a brim portion extending radially inwards from the rotatable axial surface such that the rotatable axial surface is arranged at a larger radius than the innermost portion of the brim portion. The brim portion is forming a ring-shaped sealing gap between the rotating member and the stationary axial surface.

As used herein, the term "axially" denotes a direction which is parallel to the rotational axis (X). Accordingly, relative terms such as "above", "upper", "top", "below", "lower", and "bottom" refer to relative positions along the rotational axis (X). Correspondingly, the term "radially" denotes a direction extending radially from the rotational axis (X). A "radially inner position" or "a larger radius" thus refers to a position closer to the rotational axis (X) compared to "a radially outer position or "a smaller radius".

The contaminants in the gas may comprise liquid contaminants, such as oil, and soot.

Consequently, the centrifugal separator may be for separating liquid contaminants, such as oil, from gas. The gas may be crankcase gas of a combustion engine. However, the centrifugal separator may also be suitable for cleaning gases from other sources, for instance the environment of machine tools which frequently contains large amounts of liquid contaminants in the form of oil droplets or oil mist.

The stationary casing of the centrifugal separator may comprise a surrounding side wall, and first and second end walls, which enclose the separation space. The stationary casing may have a cylindrical shape with circular cross-section having a radius R from the axis (X) of rotation to the surrounding side wall. This radius R may be constant at least with respect to a major part of the circumference of the surrounding side wall. The stationary casing may also be slightly conical. The first and second end walls may thus form an upper end wall and a lower end wall of the cylindrical shaped casing.

The gas inlet of the centrifugal separator may be arranged through the first end wall or through the surrounding side wall close to the first end wall, thus at the top of the separator, such that gas entering through the gas inlet is directed to the separation space.

However, the gas inlet may also be arranged through the second end wall or through the surrounding side wall close to the second end wall, thus at the bottom of the separator The drainage outlet is arranged in the lower portion of the stationary casing, such as arranged in the second end wall, e.g. at the bottom of the separator. Thus, the drainage outlet may be arranged centrally in an end wall opposite the end wall through which, or at which, the inlet is arranged. The drainage outlet of the centrifugal separator may further be formed by several spot-shaped through holes of the stationary casing or by a single drainage passage. The drainage outlet may be arranged at the axis of rotation (X) or centered on the axis of rotation (X). The drainage outlet may also be in an annular collection groove at the inner end wall of the stationary casing.

The gas outlet may be arranged in an upper or lower portion of the stationary casing. The gas outlet may thus comprise a through hole through the casing and may further comprise connection means to conduits or the like for the cleaned gas.

The rotating member is arranged for rotation during operation by means of the drive member. The rotating member comprises a plurality of separation members arranged in the separation space. The separation members of the rotating member are examples of surface-enlarging inserts that promote separation of contaminants from the gas. The separation members may be a stack of separation discs. The separation discs of the stack may be frustoconical. A frustoconical disc may have a planar portion extending in a plane that is perpendicular to the axis of rotation, and a frustoconical portion that may extend upwards or downwards. The planar portion may be closer to the rotational axis than the frustoconical portion. Further, the discs of the stack may be radial discs, in which substantially the whole disc extends in a plane that is perpendicular to the axis of rotation.

During operation, gas to be cleaned may be directed centrally through the plurality of separation members, such as centrally through the stack of separation discs. In such a set-up, the rotating member may further define a central space formed by at least one through hole in each of the separation members. This central space is connected to the gas inlet and configured to convey the gas to be cleaned from the gas inlet to the interspaces between the separation members, such as between the interspaces between the discs of a stack of separation discs. A separation disc that may be used as separation member may comprise a central, essentially flat portion perpendicular to the axis of rotation. This portion may comprise the through holes that form parts of the central space.

Thus, the centrifugal separator may be configured to lead gas to be cleaned, such as crankcase gases, from the gas inlet into a central portion of the rotating member. In this manner the crankcase gases may be "pumped" from the central portion of the rotating member into the interspaces between the separation discs in the stack of separation discs by the rotation of the rotating member. Thus, the centrifugal separator may work according to the concurrent flow principle, in which the gas flows in the disc stack from a radial inner part to a radial outer part, which is opposite to a separator operating according to the counter-current flow principle, in which the gas is conducted into the centrifugal rotor at the periphery of the rotor and is led towards a central part of the rotor.

The drive member may for example comprise a turbine wheel, rotated by means of an oil jet from the lubrication oil system of the combustion engine or a free jet wheel comprising a blow-back disk. However, the drive member may also be independent of the combustion engine and comprise an electrical motor, a hydraulic motor or a pneumatic motor.

It is also to be understood that the separation members, such as separation discs, not necessarily have to be arranged in a stack. The separation space may for example comprise axial discs, or plates that extend around the axis of rotation. The axial discs or plates may be planar, i.e. extending in planes that are parallel to the axis of rotation. The axial discs or plates may also have a slightly or significantly curved shape, such as an arcuate or spiral shape, as seen in a radial plane.

Further, according to the first aspect the centrifugal separator further comprises a stationary axial surface extending into the separation space, and the rotating member comprises a rotatable axial surface arranged radially outside the stationary axial surface.

Thus, the rotatable axial surface is arranged radially outside the stationary axial surface such that the stationary axial surface and the rotatable axial surface axially overlap at least to some extent. The rotatable axial surface and the stationary axial surface may be in the form of a cylinder extending in the direction of the rotational axis (X).

Moreover, the rotatable axial surface is arranged at the gas inlet such that liquid contaminants present in the gas to be cleaned are pressed against the rotatable axial surface during operation. Consequently, the rotatable axial surface is arranged in proximity to the gas inlet such that liquid contaminants, such as oil, are due to centrifugal forces pressed radially outwards onto the rotatable axial surface of the rotating member. On this axial surface, liquid contaminants will be spread out both axially upwards and downwards to form e.g. a liquid film on the rotatable axial surface.

Furthermore, the rotating member comprises a brim portion extending radially inwards from the rotatable axial surface and forming a ring-shaped sealing gap between the rotating member and the stationary axial surface. The rotatable axial surface is thus arranged at a larger radius than the innermost portion of the brim portion. The brim portion forms a flange on the rotatable axial surface. The brim portion may extend throughout the whole circumference of the rotatable axial surface. The brim portion extending radially inwards means that it has its radial inner position R1 that is closer to the axis of rotation (X) than the radial position R2 of the rotatable axial surface.

Further, this brim portion is in close proximity with the stationary axial surface so as to form a seal, i.e. to prevent (or significantly restrict) a leakage of fluid therebetween.

The first aspect of the invention is based on the insight that oil entering with the gas flow and hitting an axial surface of the rotating member will be pressed both upwards and downwards on such surface. This increases the risk of oil entering portions of the centrifugal separator that are located above the separation member, if the gas inlet is arranged in an upper portion of the separator, or portions of the centrifugal separator that are located below the separation member, if the gas inlet is arranged in a lower portion of the separator. If for example the gas outlet is arranged at such portions, there is an obvious risk of oil carry-over into the extracted gas. By adding the brim portion, i.e. an edge or flange on the rotatable axial surface, it may prevent oil from being pressed axially passed this brim portion. Thus, the brim portion function as a catching means, or a rotating barrier, for oil that is being pressed onto the rotatable axial surface, thereby reducing the risk of oil escaping into the clean gas.

The brim portion may be arranged as a separate component that is attached to the rotatable axial surface, or it may be formed as one-piece with the rotatable axial surface In embodiments of the first aspect, the stationary axial surface forms a radial outer surface of the gas inlet.

Thus, the stationary axial surface may extend through the stationary casing and may form the gas inlet. Thus, the gas inlet may be arranged such that gas is introduced through the stationary casing radially inwards from the stationary axial surface. As an example, the stationary axial surface may form an inlet pipe. As a further example, the stationary inlet surface may form a cylindrical wall, such as a downwardly projecting cylindrical wall if the gas inlet is arranged in an upper end portion of the stationary casing.

In embodiments of the first aspect, the stationary axial surface is a cylindrical surface and the rotatable axial surface is arranged concentrically with and radially outwards from the stationary axial surface.

Consequently, the stationary axial surface may form a sleeve extending through the stationary casing, and the rotatable axial surface of the rotating member may surround an end portion of the stationary sleeve in a way such that a smallest possible interspace is present between the brim portion and the sleeve.

In embodiments of the first aspect, the rotating member comprises a central space into which the gas to be cleaned is guided from the inlet and the ring shaped sealing gap is configured for sealing the central space from a space radially outside the rotating member.

The space radially outside the rotating member may thus be a portion of the separation space. As an example, the gas outlet may be arranged in the space radially outside the rotating member and in the same axial portion of the separator as the ring-shaped sealing gap.

As an example, the rotatable axial surface may be an inner surface of the central space.

In embodiments of the first aspect, the separation members is a stack of frustoconical separation discs. Further, the central space may be arranged radially inside the conical portions of the frustoconical separation discs. A part of the central space may be defined by through holes in the radially inner portions of the separation discs. The central space may however extend axially above the uppermost inner portion of the stack of separation discs.

The gas inlet may be arranged to guide the gas to be cleaned into the central space of the rotating member, and thus axially from above if the inlet is arranged in an upper portion of the stationary casing.

In embodiments of the first aspect, the separation members is a stack of separation discs arranged under a top disc, and wherein the rotatable axial surface is a rim extending axially from an inner portion of the top disc.

The rim may thus define an inner surface of the central space, such as an upper inner surface of the central space. The stack of separation discs may be arranged between a top disc and a lower end plate. Such top disc and end plate may have a larger thickness than a single separation disc. As an example, the disc stack may be compressed between the top disc and the lower end plate.

In embodiments of the first aspect, the brim portion extending radially inwards from the rotatable axial surface is arranged at the axial upper portion of the rotatable axial surface.

As an example, the brim portion may form the uppermost portion of the rotatable axial surface.

In embodiments of the first aspect, the rotating member further comprises an uppermost radial brim, and the brim portion extending radially inwards from the rotatable axial surface is arranged as a radial extension of the uppermost radial brim.

The uppermost radial brim may extend radially at least half of the radial distance of the separation space. As an example, the uppermost radial brim may be arranged axially above the gas outlet for clean gas, e.g. when the gas outlet is arranged in an upper portion of a surrounding side wall of the stationary casing. The uppermost radial brim may be arranged at the upper inner end wall of the stationary casing.

The uppermost radial brim may be configured for generating a rotating gas flow, such as a rotating gas flow over the gas outlet.

In embodiments of the first aspect, the brim portion extends radially inwards from the rotatable axial surface a radial distance (d) that is less than 5 mm, such as less than 1 mm.

Consequently, the radial distance R1 to the brim portion may be less than 5 mm, such as less than 1 mm, shorter than the radial distance R2 to the rotatable axial surface. Thus, the rotating barrier formed by the brim portion may extend radially less than 5 mm, such as less than 1 mm from the rotatable axial surface.

In embodiments of the first aspect, the gas outlet is arranged in the upper portion of the stationary casing. As an example, the gas outlet may be arranged in the upper portion of a surrounding side wall of the stationary casing or arranged in an upper end wall of the stationary casing.

In embodiments of the first aspect, the gas inlet is arranged in the upper portion of the stationary casing Thus, the gas inlet may be arranged in an upper end wall of the stationary casing. The gas inlet may be arranged around the axis of rotation (X). Hence, the gas inlet may be arranged in an upper end wall and the gas outlet may be arranged in an upper portion of the surrounding side wall of the stationary casing.

As a second aspect of the invention, there is provided a method for cleaning gas containing contaminants comprising guiding gas containing contaminants to a centrifugal separator according to the first aspect above during rotation of the rotating member,
discharging cleaned gas from the gas outlet, and
discharging contaminants from the drainage outlet.

The contaminants in the gas may comprise liquid contaminants, such as oil, and soot.

This aspect may generally present the same or corresponding advantages as the former aspect. Effects and features of this second aspect are largely analogous to those described above in connection with the first aspect. Embodiments mentioned in relation to the first aspect are largely compatible with the second aspect.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIG. 2a shows a close-up view of the stationary axial surface, the rotatable axial surface and the seal between the rotating member and the stationary axial surface.

FIG. 2b illustrates how liquid contaminants are pressed against the rotatable axial surface during operation.

FIG. 2c shows a close-up view of an embodiment of the stationary axial surface, the rotatable axial surface and the seal between the rotating member and the stationary axial surface.

DETAILED DESCRIPTION

Figure 1:
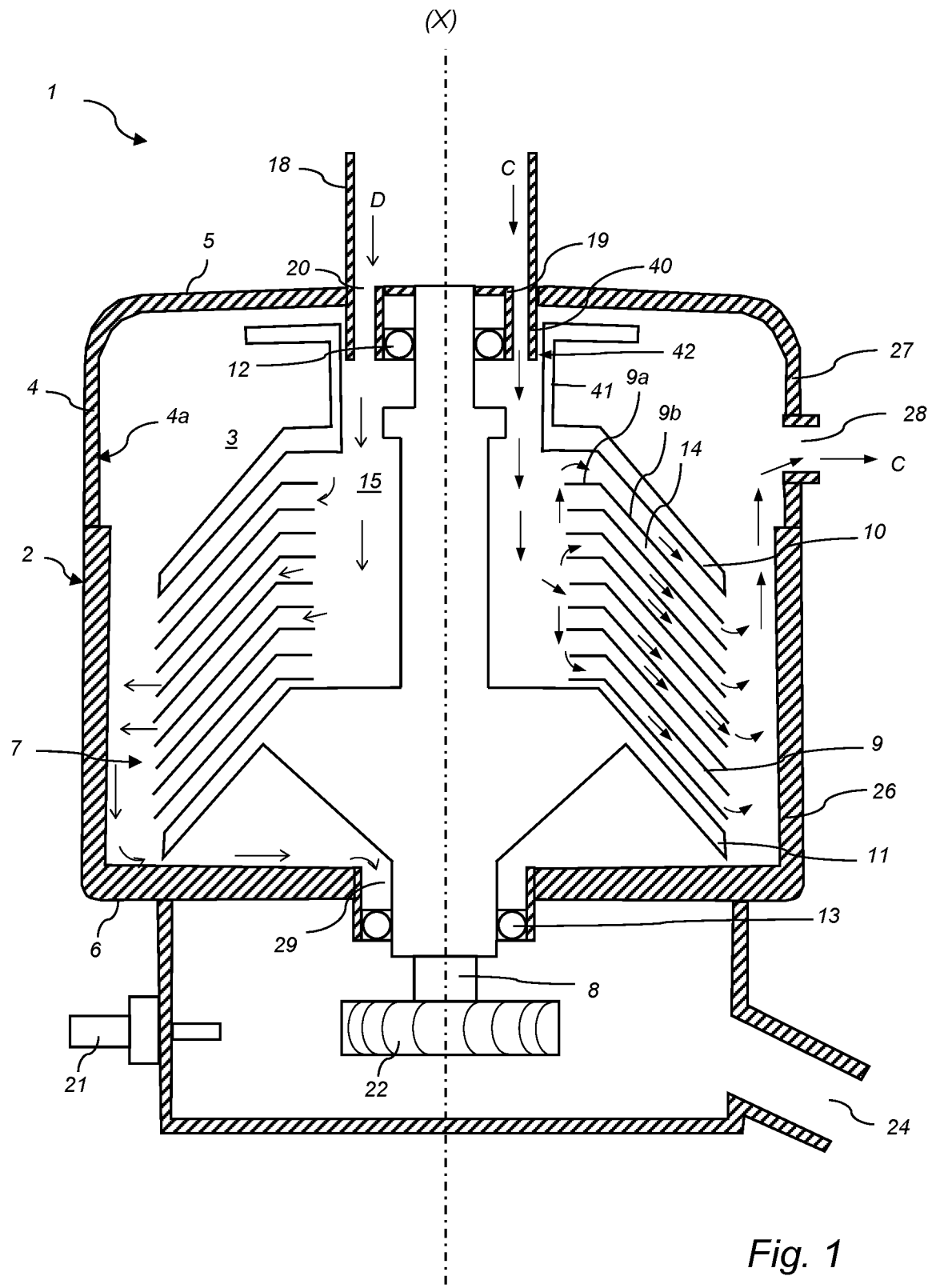
FIG. 1 shows a schematic drawing of a cross-section of a centrifugal separator for cleaning gas

The centrifugal separator according to the present disclosure will be further illustrated by the following description with reference to the accompanying drawings.

FIG. 1 shows a section of a centrifugal separator 1 according to the present disclosure. The centrifugal separator 1 comprises a stationary casing 2, which is configured to be mounted to a combustion engine (not disclosed), especially a diesel engine, at a suitable position, such as on top of the combustion engine or at the side of the combustion engine.

It is to be noted that the centrifugal separator 1 is also suitable for cleaning gases from other sources than combustion engines, for instance the environment of machine tools which frequently contains large amounts of liquid contaminants in the form of oil droplets or oil mist.

The stationary casing 2 encloses a separation space 3 through which a gas flow is permitted. The stationary casing 2 comprises, or is formed by, a surrounding side wall 4, an upper end wall 5 and a lower end wall 6.

The centrifugal separator comprises a rotating member 7, which is arranged to rotate around an axis (X) of rotation. It should be noted that the stationary casing 2 is stationary in relation to the rotating member 7, and preferably in relation to the combustion engine to which it may be mounted.

The stationary casing 2 has a radius from the axis (X) of rotation to the surrounding side wall 4 that is constant at least with respect to a major part of the circumference of the surrounding side wall 4. The surrounding side wall 4 thus has a circular, or substantially, circular cross-section.

The rotating member 7 comprises a spindle 8 and a stack of separation discs 9 attached to the spindle 8. All the separation discs of the stack 9 are provided between a top disc 10 and a lower end plate 11.

The spindle 8, and thus the rotating member 7, is rotatably supported in the stationary casing 2 by means of an upper bearing 12 and a lower bearing 13, the bearings being arranged one on each side of the stack of separation discs 9. The upper bearing 12 is supported by a cap 19 which by a cylindrical part surrounds an upper end portion of the centrifugal rotor shaft, i.e. the spindle 8, the upper end portion being situated axially above the upper bearing 12. The gas inlet 20 is formed by through holes between the cap 19 and stationary inlet conduit 21, through which the inlet conduit 18 communicates with the central space 15.

The separation discs of the disc stack 9 are frusto-conical and extend outwardly and downwardly from the spindle 8. The separation discs thus comprise a flat portion 9a, which extend perpendicularly to the axis of rotation (X), and a conical portion 9b, that extend outwardly and downwardly from the flat portion 9a.

It should be noted that the separation discs also could extend outwardly and upwardly, or even radially.

The separation discs of the stack 9 are provided at a distance from each other by means of distance members (not disclosed) in order to form interspaces 14 between adjacent separation discs 9, i.e. an interspace 14 between each pair of adjacent separation discs 9. The axial thickness of each interspace 14 may e.g. be in the order of 1-2 mm.

The separation discs of the stack 9 may be made of plastic or metal. The number of separation discs in the stack 9 is normally higher than indicated in FIG. 1 and may be for instance 50 to 100 separation discs 9 depending of the size of the centrifugal separator.

The centrifugal separator 1 comprises an oil nozzle 21 arranged for being connected to an engine oil circuit of an internal combustion engine. During running of the internal combustion engine, oil is pumped through the oil nozzle 21 onto a wheel 22 connected to the spindle 8 to thereby rotate the rotating member 7 and thus the stack of separation discs 9.

As an alternative, the centrifugal separator 1 may comprise an electric motor arranged to rotate the spindle 8 and rotating member 7. As a further alternative, the centrifugal separator 3 may comprise a turbine wheel connected to the spindle 8, where the turbine wheel is arranged to be driven by exhaust gases from the internal combustion engine to rotate the spindle 8 and the rotating member 7. The rotating member 7 may also be arranged for being rotated by a mechanical drive unit. Thus, the centrifugal separator may comprise a mechanical drive unit for rotating the rotating member.

The rotating member 7 defines a central space 15. The central space 15 is formed at least partly by a through hole in each of the separation discs 9. In the embodiments of FIG. 1, the central space 15 is formed by a plurality of through holes, each extending through the top disc 10 and through each of the separation discs 9, but not through the lower end plate 11. The through holes are arranged in the flat portions 9a of the separation discs.

The gas inlet 20 is for the supply of the gas to be cleaned. The gas inlet 20 extends through the stationary casing 2, and more precisely through upper end wall 5. The gas inlet 20 communicates with the central space 15 so that the gas to be cleaned is conveyed from the inlet 20 via the central space 15 to the interspaces 14 of the stack of separation discs 9. The gas inlet 20 is configured to communicate with the crankcase of the combustion engine, or any other source, via an inlet conduit 18 permitting the supply of crankcase gas from the crankcase to the gas inlet 20 and further to the central space 15 and the interspaces 14 as explained above.

The centrifugal separator 1 comprises a drainage outlet 29 arranged in the lower portion 26 of the stationary casing 2 and configured to permit discharge of liquid contaminants separated from the gas The drainage outlet 29 is in this embodiment in the form of through holes arranged in the lower end wall 6 so that separated liquid contaminants flow through the second bearing 13 as they are drained from the separation space 3. The separated oil, and other particles and/or substances, is led to an oil outlet 24 of the centrifugal separator 1, which together with oil from the oil nozzle 21 used to drive the wheel 22, may be led back to the engine oil circuit of an internal combustion engine.

The gas outlet 28 of the centrifugal separator 1 is arranged in the upper portion 27 of the stationary casing 2 and is configured to permit discharge of cleaned gas. The gas outlet 28 comprises an outlet opening through a wall of the stationary casing 2. The gas outlet 28 is in this embodiment arranged in the upper portion of the surrounding side wall 4, but the gas outlet 28 could also be arranged e.g. in the upper end wall 5.

During operation of the centrifugal separator as shown in FIG. 1, the rotating member 17 is kept in rotation by the oil nozzle supplying oil against the wheel 22. As an example, the rotational speed may be in the range of 7.500-12.000 rpm.

Contaminated gas, e.g. crankcase gas from the crankcase of an internal combustion engine, is supplied to the gas inlet 20 via conduit 18. This gas is conducted further into the central space 15 and from there into and through the interspaces 14 between the separation discs of the stack 9. As a consequence of the rotation of the rotating member 7 the gas is brought to rotate, whereby it is pumped further on radially outwardly through gaps or interspaces 14.

During the rotation of the gas in the interspaces 14, solid or liquid particles such as oil suspended in the gas are separated therefrom. The particles settle on the insides of the conical portions 9b of the separation discs and slide or run after that radially outwardly thereon. When the particles and/or liquid drops have reached out to the radial outer edges of the separation discs 9, they are thrown away from the rotating member 7 and hit the inner surface 4a of the surrounding side wall 4. Separated oil particles may form a film on the surrounding inner surface 4a due to the rotating flow of gas. From there, oil may be pulled by gravity downwardly to bottom end wall 6 and then and leave the separation space 3 through the drainage outlet 29. For this, the inner wall of the bottom end wall 6 may be tilted radially inwards, so that oil leaving the recesses may be pulled by gravity towards drainage outlet 29. The path of the contaminants in the gas is schematically illustrated by arrows "D" in FIG. 1.

Cleaned gas freed from particles and exiting from the stack of separation discs 9 leaves the stationary casing 2 through the gas outlet 28. The path of the gas through the centrifugal separator 1 is schematically shown by arrows "C" in FIG. 1.

The centrifugal separator 1 further comprises a ring-shaped sealing gap 42 between the central space 15 and the separation space 3. This is illustrated in more detail in FIGS. 2a-c.

As seen in FIG. 2a, the separator further comprises a stationary axial surface 40 in the form of a downwardly projecting cylindrical surface extending into the separation space 3. This cylindrical collar 40 forms a radial outer surface of the gas inlet 20. In other words, the gas inlet may be formed by gas inlet opening 40a is formed between the stationary axial surface 40 and the cap 19 supporting the upper bearing 12. The gas inlet opening 40a may be in the form several through openings distributed around rotational axis (X).

Further, the rotating member 7 comprises a rotatable axial surface 41 arranged radially outside the stationary axial surface 40. In this example, the rotatable axial surface 41 is a rim upstanding axially from the radially inner portion of the top disc 10. Thus, the top disc 10 and the axial rim 41 may be formed as one piece.

The rotatable axial surface, or rim, 41 is thus arranged concentrically with and radially outwards from the stationary axial surface 40 and also forms an inner surface of the central space 15.

This rim 41 is arranged in close proximity to the gas inlet such that liquid contaminants present in the gas to be cleaned that flow out from the gas inlet opening 40a is pressed against the axial rim 41 due to the centrifugal forces during operation of the centrifugal separator 1

The axial ring-shaped sealing gap 42 between the stationary axial surface 40 and the rotating member 7 is formed between a brim portion 44 that extends radially inwards from the axial rim 41 and the stationary collar 40. In the embodiment shown in FIG. 2a, this brim portion 44 is arranged at the axially uppermost portion of the axial rim 41 and as a radial extension of the uppermost radial brim 43. This uppermost radial brim 43 is thus arranged on the rotating member 7 and arranged on the axial rim 41. The radial brim 43 is configured for generating a rotating gas flow over the gas outlet 28 during operation of the centrifugal separator 1.

FIG. 2b shows how liquid contaminants and larger aerosols are pressed against the axial rim 41 during operation, as illustrated by arrows "D" in FIG. 2a. Thus, liquid contaminants and larger aerosols, when hitting axial rim 41, is pressed both axially upwards and downwards on axil rim 41. Due to the brim portion having a radially inner position at radius R1 and the axial having a radial position at radius R2, and R2 being larger than R1, the brim portion 44 functions as a protecting wall that reduces the risk of liquid contaminants and aerosols on the axial rim 41 from escaping via the sealing gap 42, and thus out to the separation space 3 without having passed the stack of separation discs 9. The brim portion 44 extends less than 1 mm from the axial rim 41, i.e. the radial distance d, which is R2−R1, is less than 1 mm.

It is also to be understood that the brim portion 44 may be provided on the axial rim 41 at any position that is radially outside the stationary collar 40, i.e. the sealing gap 42 may be formed anywhere on the axially overlapping portions of the stationary collar 40 and the rotatable axial rim 41. This is illustrated in FIG. 2c, in which the brim portion 44 is arranged axially below the uppermost position of the axial rim 41 but still radially outside the lower portion of the stationary collar 40.

The invention is not limited to the embodiment disclosed but may be varied and modified within the scope of the claims set out below. The invention is not limited to the orientation of the axis of rotation (X) disclosed in the figures. The term "centrifugal separator" also comprises centrifugal separators with a substantially horizontally oriented axis of rotation. In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A centrifugal separator for cleaning gas containing contaminants comprising:
   a stationary casing, enclosing a separation space through which a gas flow is permitted;
   a gas inlet extending through the stationary casing and permitting supply of the gas to be cleaned;
   a rotating member comprising a plurality of separation members arranged in said separation space and being arranged to rotate around an axis of rotation;
   a gas outlet configured to permit discharge of cleaned gas and comprising an outlet opening through a wall of the stationary casing;
   a drainage outlet arranged in a lower portion of the stationary casing and configured to permit discharge of liquid contaminants separated from the gas to be cleaned;
   a drive member for rotating the rotating member; and
   a stationary axial surface extending into said separation space,
   wherein said rotating member comprises a rotatable axial surface arranged radially outside said stationary axial surface,
   wherein said rotatable axial surface is arranged at the gas inlet such that liquid contaminants present in the gas to be cleaned is pressed against the rotatable axial surface during operation, and
   wherein said rotating member comprises a brim portion extending radially inwards from said rotatable axial surface such that the rotatable axial surface is arranged at a larger radius than an innermost portion of the brim portion, said brim portion forming a ring-shaped sealing gap between the rotating member and the stationary axial surface.

2. The centrifugal separator according to claim 1, wherein said stationary axial surface forms a radial outer surface of said gas inlet.

3. The centrifugal separator according to claim 1, wherein said stationary axial surface is a cylindrical surface and wherein said rotatable axial surface is arranged concentrically with and radially outwards from said stationary axial surface.

4. The centrifugal separator according to claim 1, wherein said rotating member comprises a central space into which said gas to be cleaned is guided from the gas inlet, and wherein said ring-shaped sealing gap is configured for sealing said central space from a space radially outside said rotating member.

5. The centrifugal separator according to claim 4, wherein said rotatable axial surface is an inner surface of said central space.

6. The centrifugal separator according to claim 1, wherein said separation members is a stack of frustoconical separation discs.

7. The centrifugal separator according to claim 1, wherein said plurality of separation members is a stack of separation discs arranged under a top disc, and wherein said rotatable axial surface is a rim extending axially from an inner portion of said top disc.

8. The centrifugal separator according to claim 1, wherein said brim portion extending radially inwards from said rotatable axial surface is arranged at an axial upper portion of the rotatable axial surface.

9. The centrifugal separator according to claim 1, wherein said rotating member further comprises an uppermost radial brim, and said brim portion extending radially inwards from said rotatable axial surface is arranged as a radial extension of said uppermost radial brim.

10. The centrifugal separator according to claim 1, wherein the brim portion extends radially inwards from said rotatable axial surface a radial distance that is less than 5 mm.

11. The centrifugal separator according to claim 1, wherein said gas outlet is arranged in an upper portion of the stationary casing.

12. The centrifugal separator according to claim 11, wherein said gas outlet is arranged in the upper portion of a surrounding side wall of the stationary casing.

13. The centrifugal separator according to claim 1, wherein said gas inlet is arranged in an upper portion of the stationary casing.

14. The centrifugal separator according to claim 1, wherein the brim portion extends radially inwards from said rotatable axial surface a radial distance that is less than 1 mm.

15. The centrifugal separator according to claim 2, wherein said stationary axial surface is a cylindrical surface and wherein said rotatable axial surface is arranged concentrically with and radially outwards from said stationary axial surface.

16. The centrifugal separator according to claim 2, wherein said rotating member comprises a central space into which said gas to be cleaned is guided from the gas inlet, and wherein said ring-shaped sealing gap is configured for sealing said central space from a space radially outside said rotating member.

17. The centrifugal separator according to claim 3, wherein said rotating member comprises a central space into which said gas to be cleaned is guided from the gas inlet, and wherein said ring-shaped sealing gap is configured for sealing said central space from a space radially outside said rotating member.

18. The centrifugal separator according to claim 2, wherein said plurality of separation members is a stack of frustoconical separation discs.

19. The centrifugal separator according to claim 3, wherein said plurality of separation members is a stack of frustoconical separation discs.

20. The centrifugal separator according to claim 4, wherein said plurality of separation members is a stack of frustoconical separation discs.

* * * * *